(12) United States Patent
Takahashi

(10) Patent No.: US 12,046,777 B2
(45) Date of Patent: Jul. 23, 2024

(54) SECONDARY BATTERY, BATTERY PACK, ELECTRONIC DEVICE, ELECTRIC TOOL, AND ELECTRIC VEHICLE

(71) Applicant: MURATA MANUFACTURING CO., LTD., Kyoto (JP)

(72) Inventor: Masashi Takahashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 370 days.

(21) Appl. No.: 17/583,620

(22) Filed: Jan. 25, 2022

(65) Prior Publication Data

US 2022/0149490 A1 May 12, 2022

Related U.S. Application Data

(63) Continuation of application No. PCT/JP2020/027603, filed on Jul. 16, 2020.

(30) Foreign Application Priority Data

Aug. 8, 2019 (JP) .................. 2019-146471

(51) Int. Cl.
  *H01M 50/531* (2021.01)
  *H01M 10/0587* (2010.01)
(52) U.S. Cl.
  CPC ..... *H01M 50/531* (2021.01); *H01M 10/0587* (2013.01); *H01M 2220/20* (2013.01); *H01M 2220/30* (2013.01)
(58) Field of Classification Search
  CPC ........... H01M 50/531; H01M 10/0587; H01M 50/533; H01M 50/536; H01M 50/538

(Continued)

(56) References Cited

U.S. PATENT DOCUMENTS

2006/0024572 A1   2/2006 Lee
2012/0180308 A1*  7/2012 Yamada ............ H01M 10/0409
                                              29/623.1

(Continued)

FOREIGN PATENT DOCUMENTS

CN    102576849       7/2012
JP    2001102031 A    4/2001

(Continued)

OTHER PUBLICATIONS

International Search Report of corresponding PCT application PCT/JP2020/027603, dated Oct. 13, 2020.

(Continued)

*Primary Examiner* — Pamela H Weiss
*Assistant Examiner* — John S Medley
(74) *Attorney, Agent, or Firm* — K&L Gates LLP

(57) ABSTRACT

A secondary battery including an electrode wound body having a structure in which a positive electrode and a negative electrode are stacked and wound with a separator interposed therebetween, a positive electrode current collector plate, a negative electrode current collector plate and an exterior can that accommodates the electrode wound body, the positive electrode current collector plate, and the negative electrode current collector plate. The positive electrode has a first covered portion covered with a positive electrode active material layer and a positive electrode active material non-covered portion on a positive electrode foil, and the negative electrode has a second covered portion covered with a negative electrode active material layer and a negative electrode active material non-covered portion on a negative electrode foil.

13 Claims, 12 Drawing Sheets

(58) Field of Classification Search
USPC .......................................................... 429/211
See application file for complete search history.

(56) References Cited

U.S. PATENT DOCUMENTS

| | | | |
|---|---|---|---|
| 2014/0113185 A1 | | 4/2014 | Mori et al. |
| 2017/0365839 A1* | | 12/2017 | Kawate .................. H01G 11/82 |
| 2018/0130994 A1 | | 5/2018 | Yamaguchi et al. |

FOREIGN PATENT DOCUMENTS

| | | | | | |
|---|---|---|---|---|---|
| JP | 2003203620 A | | 7/2003 | | |
| JP | 2006040902 A | | 2/2006 | | |
| JP | 2007242362 A | * | 9/2007 | ............ | H01M 10/04 |
| JP | 2007265846 A | | 10/2007 | | |
| JP | 2010061893 A | | 3/2010 | | |
| JP | 2010080081 A | | 4/2010 | | |
| JP | 2017107709 A | | 6/2017 | | |
| WO | 2013001821 A1 | | 1/2013 | | |
| WO | 2016174811 A1 | | 11/2016 | | |

OTHER PUBLICATIONS

Chinese Office Action issued Sep. 19, 2023 in corresponding Chinese Application No. 202080056060.9.

* cited by examiner

● : WELDING POINT

SECONDARY BATTERY, BATTERY PACK, ELECTRONIC DEVICE, ELECTRIC TOOL, AND ELECTRIC VEHICLE

CROSS REFERENCE TO RELATED APPLICATIONS

The present application is a continuation of PCT patent application no. PCT/JP2020/027603, filed on Jul. 16, 2020, which claims priority to Japanese patent application no. JP2019-146471 filed on Aug. 8, 2019, the entire contents of which are being incorporated herein by reference.

BACKGROUND

The present disclosure generally relates to a secondary battery, a battery pack, an electronic device, an electric tool, and an electric vehicle.

The use of lithium ion batteries has been extended to automobiles, machines, and the like, and high-output batteries have been required. As one of methods for producing this high output, high rate discharge has been proposed. High rate discharge is a discharge in which a relatively large current flows, and at that time, the size of the internal resistance of a battery becomes a problem. Examples of the internal resistance of the battery include the contact resistance between a positive electrode foil, a negative electrode foil, and current collector plates for extracting current.

SUMMARY

The present disclosure generally relates to a secondary battery, a battery pack, an electronic device, an electric tool, and an electric vehicle.

To improve the battery technology, it is necessary to secure a larger welding area in order to reduce the resistance of the cell. In addition, there is a problem in at least one type of the conventional battery technology that a current collector or a bent current collector that comes into vertical contact with the current collector plate is present on the back face of the current collector plate, and there is a high possibility that laser light will penetrate the current collector plate during joining by laser irradiation, which makes welding difficult.

Therefore, One of the objects of the present disclosure is to provide a secondary battery in which laser welding of a battery current collector plate is satisfactorily performed, a battery pack, an electronic device, an electric tool, an electric aircraft, and an electric vehicle.

According to an embodiment of the present disclosure, a secondary battery is provided. The secondary battery includes an electrode wound body having a structure in which a positive electrode and a negative electrode are stacked and wound with a separator interposed therebetween, a positive electrode current collector plate, a negative electrode current collector plate, and an exterior can that accommodates the electrode wound body, the positive electrode current collector plate, and the negative electrode current collector plate. The positive electrode has a first covered portion covered with a positive electrode active material layer and a positive electrode active material non-covered portion on a positive electrode foil, and the negative electrode has a second covered portion covered with a negative electrode active material layer and a negative electrode active material non-covered portion on a negative electrode foil. The positive electrode active material non-covered portion is joined to the positive electrode current collector plate on a first end face of the electrode wound body, and the negative electrode active material non-covered portion is joined to the negative electrode current collector plate on a second end face of the electrode wound body. One or both of the positive electrode current collector plate and the negative electrode current collector plate have a band-shaped portion and a plate-like portion in which an opening is formed, and the plate-like portion has an opposing face that faces an end face of the electrode wound body and a non-opposing face. At least a first part of the positive electrode active material non-covered portion or a first part of the negative electrode active material non-covered portion penetrates the opening and is joined to the non-opposing face of the plate-like shape.

The present disclosure provides a battery pack according to an embodiment including the above-described secondary battery, a controller configured to control the secondary battery, and an exterior body enclosing the secondary battery.

The present disclosure provides an electronic device according to an embodiment including the above-described secondary battery or the above-described battery pack.

The present disclosure provides an electric tool according to an embodiment including the above-described battery pack and using the battery pack as a power source.

The present disclosure provides an electric vehicle according to an embodiment including the above-described secondary battery and a converter that receives supply of electric power from the secondary battery and converts the electric power into a driving force of the electric vehicle.

According to at least the embodiment of the present disclosure, a current collector plate and an active material non-covered portion can be certainly joined, and it is possible to realize a highly reliable battery with a small increase in internal resistance in the usage state of the battery.

It should be understood that the contents of the present disclosure are not to be construed as being limited by the effects exemplified in the present specification, and additional effects may be further provided.

DETAILED DESCRIPTION

As described herein, the present disclosure will be described based on examples with reference to the drawings, but the present disclosure is not to be considered limited to the examples, and various numerical values and materials in the examples are considered by way of example.

In the embodiment of the present disclosure, as a secondary battery, a lithium ion battery having a cylindrical shape will be described as an example. Of course, a battery other than the lithium ion battery or a battery having a shape other than a cylindrical shape may be used.

Figure 1:
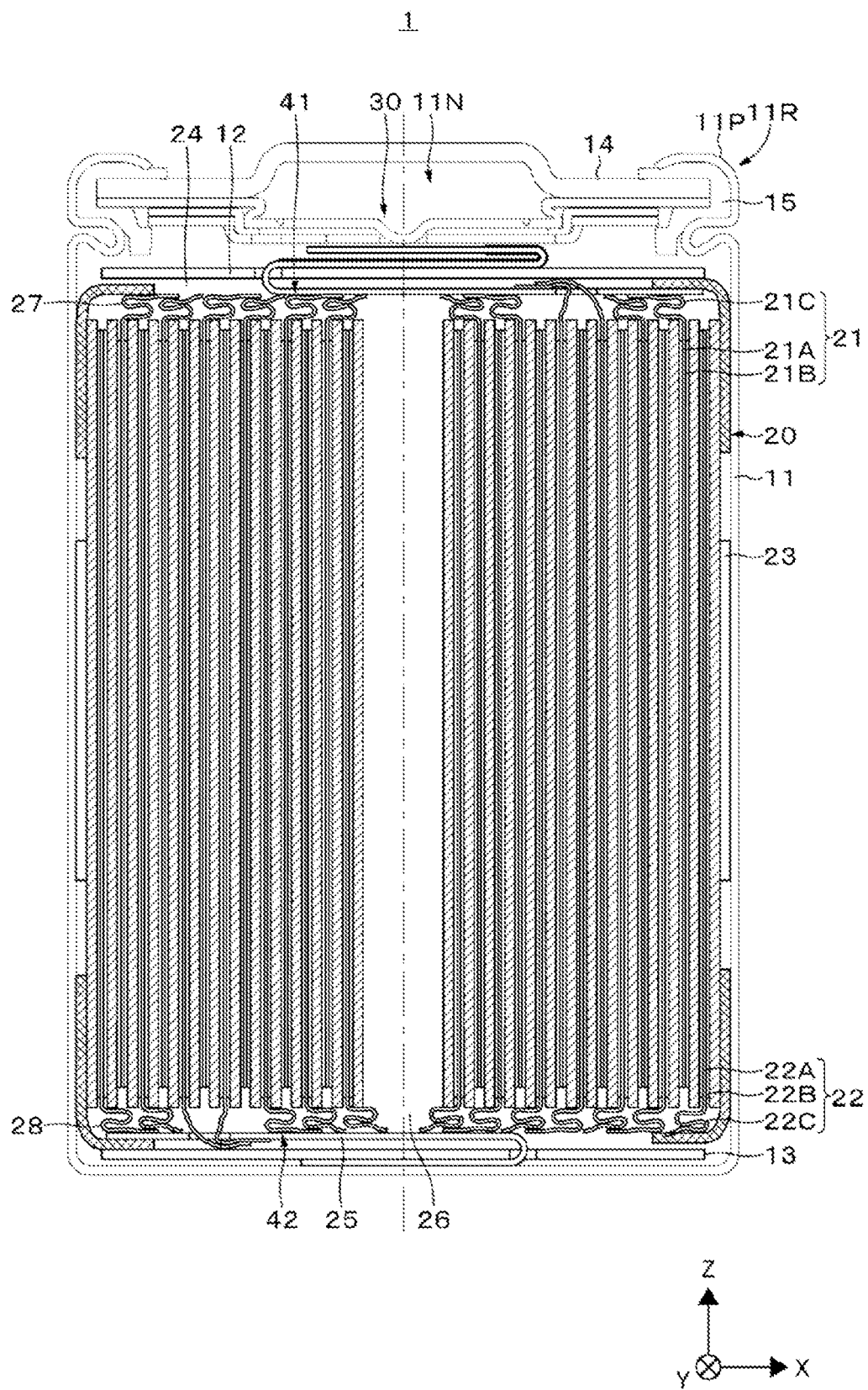
FIG. 1 is a schematic sectional view of a battery according to an embodiment of the present disclosure.

First, the overall configuration of the lithium ion battery will be described. FIG. 1 is a schematic sectional view of a lithium ion battery 1. The lithium ion battery 1 is, for example a cylindrical lithium ion battery 1 including an electrode wound body 20 accommodated inside an exterior can 11 as shown in FIG. 1.

Specifically, the lithium ion battery 1 includes a pair of insulators 12 and 13 and the electrode wound body 20 inside the exterior can 11 having a cylindrical shape. The lithium ion battery 1 may further include one kind, or two or more kinds of a positive temperature coefficient (PTC) element, a reinforcing member, and the like inside the exterior can 11.

The exterior can 11 is a member that mainly accommodates the electrode wound body 20. The exterior can 11 is a cylindrical container in which one end portion is open and the other end portion is closed. That is, the exterior can 11 has an open end portion (open end portion 11N). The exterior can 11 contains one kind, or two or more kinds of metal materials such as iron, aluminum, and alloys thereof. Note that, for example one kind, or two or more kinds of metal materials such as nickel may be plated on the surface of exterior can 11.

The insulators 12 and 13 are sheet-like members having a face substantially perpendicular to the winding axis direction (vertical direction in FIG. 1) of the electrode wound body 20. The insulators 12 and 13 are arranged in such a manner as to sandwich the electrode wound body 20 therebetween. As a material of the insulators 12 and 13, polyethylene terephthalate (PET), polypropylene (PP), bakelite and the like are used. Bakelite includes paper bakelite and cloth bakelite, which are produced by applying a phenol resin to paper or cloth and then heating it.

At the open end portion 11N of the exterior can 11, a crimp structure 11R is formed in which a battery lid 14 and a safety valve mechanism 30 are crimped with a gasket 15. This allows the exterior can 11 to be sealed in a state where the electrode wound body 20 and the like are accommodated inside the exterior can 11.

The battery lid 14 is a member that mainly closes the open end portion 11N of the exterior can 11 in a state where the electrode wound body 20 and the like are accommodated inside the exterior can 11. The battery lid 14 contains, for example, the same material as the material for forming the exterior can 11. A central region of the battery lid 14 protrudes, for example in a +Z direction. This allows a region (peripheral region) other than the central region of the battery lid 14 to be in contact with, for example, the safety valve mechanism 30.

The gasket 15 is a member that mainly seals a gap between a bent portion 11P (also referred to as crimp portion) of the exterior can 11 and the battery lid 14 by being interposed between the bent portion 11P and the battery lid 14. For example, asphalt or the like may be applied to the surface of the gasket 15.

The gasket 15 contains an insulating material. The kind of the insulating material is not particularly limited, and is a polymer material such as polybutylene terephthalate (PBT) or polypropylene (PP). This is because the gap between the bent portion 11P and the battery lid 14 is sufficiently sealed while the exterior can 11 and the battery lid 14 are electrically separated from each other.

The safety valve mechanism 30 mainly releases the internal pressure of the exterior can 11 by cancelling the sealed state of the exterior can 11 as necessary when the pressure inside the exterior can 11 (internal pressure) increases. The cause of the increase in the internal pressure of the exterior can 11 is a gas generated due to a decomposition reaction of an electrolyte solution during charging and discharging.

In the cylindrical lithium ion battery, a positive electrode 21 having a band shape and a negative electrode 22 having a band shape are spirally wound with the separator 23 interposed therebetween, and are accommodated in the exterior can 11 in a state of being impregnated with an electrolyte solution. The positive electrode 21 is obtained by forming a positive electrode active material layer 21B on one face or both faces of a positive electrode foil 21A. The material of the positive electrode foil 21A is, for example, a metal foil made of aluminum or an aluminum alloy. The negative electrode 22 is obtained by forming a negative electrode active material layer 22B on one face or both faces of a negative electrode foil 22A. The material of the negative electrode foil 22A is, for example, a metal foil made of nickel, a nickel alloy, copper, or a copper alloy. The separator 23 is a porous insulating film, which enables movement of substances such as ions and an electrolyte solution while electrically insulating the positive electrode 21 and the negative electrode 22.

The positive electrode active material layer 21B and the negative electrode active material layer 22B cover many portions of the positive electrode foil 21A and the negative electrode foil 22A, respectively, but intentionally neither of them covers the periphery of one end in the short axis direction of the band. Hereinafter, a portion not covered with the active material layer 21B or the active material layer 22B is appropriately referred to as an active material non-covered portion. In the cylindrical battery, the electrode wound body 20 is wound such that a positive electrode active material non-covered portion 21C and a negative electrode active material non-covered portion 22C overlap and face in opposite directions with the separator 23 interposed therebetween.

Figure 2:
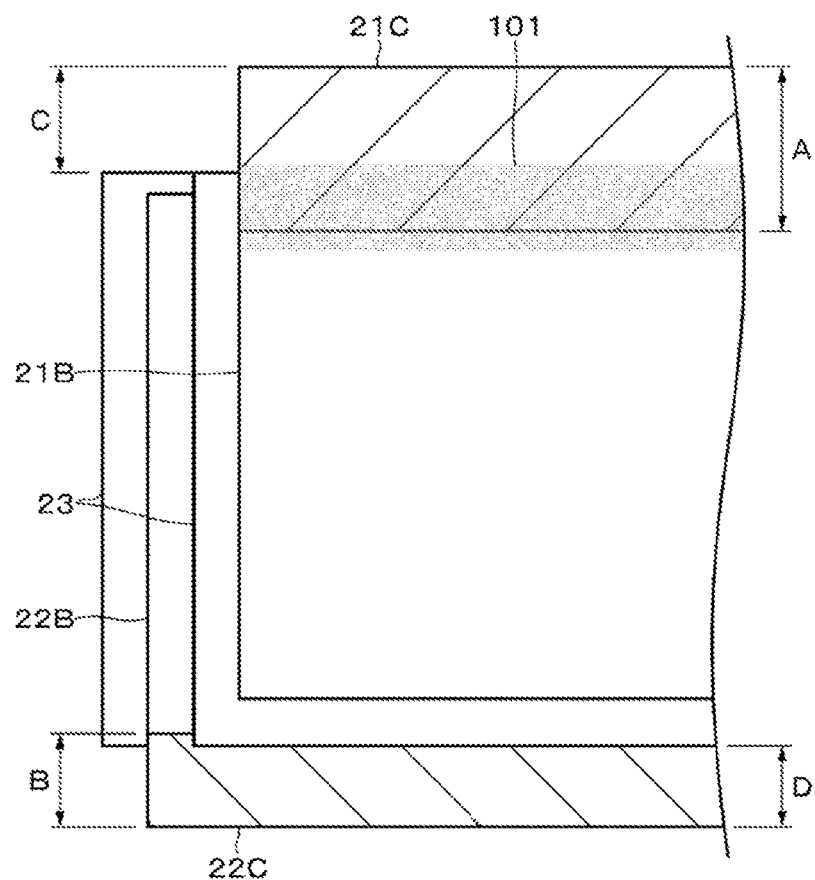
FIG. 2 is a view for describing one example of an arrangement relationship between a positive electrode, a negative electrode, and a separator in an electrode wound body according to an embodiment of the present disclosure.

FIG. 2 shows one example of a structure before winding in which the positive electrode 21, the negative electrode 22, and the separator 23 are stacked. The width of the positive electrode active material non-covered portion 21C (the upper hatched portion in FIG. 2) is A, and the width of the negative electrode active material non-covered portion 22C (the lower hatched portion in FIG. 2) is B. In one embodiment, A>B is preferable, for example, A=7 (mm) and B=4 (mm). The length of a protruding portion of the positive electrode active material non-covered portion 21C from one end of the separator 23 in the width direction is C, and the length of a protruding portion of the negative electrode active material non-covered portion 22C from the other end of the separator 23 in the width direction is D. In one embodiment, C>D is preferable, for example, C=4.5 (mm) and D=3 (mm). Here, the widths of the active material non-covered portions 21C and 22C refer to the widths in a state where they are not bent toward a through hole 26 as described later. The same applies to the length of the portion protruding from the separator 23. The width and the protruding length in the finished product of the secondary battery according to the present disclosure (state in which the active material non-covered portions 21C and 22C are bent) can be measured by peeling off the current collector plates described later and loosening the active material non-covered portions.

Because the positive electrode active material non-covered portion 21C is made of, for example, aluminum, and the negative electrode active material non-covered portion 22C is made of, for example, copper, the positive electrode active material non-covered portion 21C is typically softer (has a lower Young's modulus) than the negative electrode active material non-covered portion 22C. Therefore, in one embodiment, A>B and C>D are more preferable. In this case, when the positive electrode active material non-covered portion 21C and the negative electrode active material non-covered portion 22C are simultaneously bent at the same pressure from both electrode sides, the height of the bent portion measured from the tip of the separator 23 is the same between the positive electrode 21 and the negative electrode 22 in some cases.

A portion of the positive electrode active material non-covered portion 21C, the portion facing the negative electrode 22 with the separator 23 sandwiched therebetween, is covered with an insulating layer 101 (the gray part in FIG. 2) for example over a section having a length of 3 mm from the tip of the positive electrode active material layer 21B. As shown in FIG. 2, the lithium ion battery 1 is designed such that the width of the positive electrode active material layer 21B is smaller than the width of the negative electrode active material layer 22B. Therefore, without the insulating layer 101, Li metal or the like may deposit on the portion of the positive electrode non-covered portion 21C facing the negative electrode active material layer 22B during charging/discharging, or when the battery 1 is impacted, the impact is not absorbed at all, and the positive electrode active material non-covered portion 21C may bend and come into contact with the negative electrode 22 to cause a short circuit. The insulating layer 101 is arranged to avoid these matters.

A through hole 26 is formed at the central axis of the electrode wound body 20. The through hole 26 is a hole for inserting a winding core for assembling the electrode wound body 20 and an electrode rod for welding. Because the electrode wound body 20 is wound such that the positive electrode active material non-covered portion 21C and the negative electrode active material non-covered portion 22C overlap and face in opposite directions, a collection of the positive electrode active material non-covered portion 21C is exposed at one end face (end face 41) of the electrode wound body, and a collection of the negative electrode active material non-covered portion 22C is exposed at the other end face (end face 42) of the electrode wound body 20.

In a typical lithium ion battery, for example, a lead for current extraction is welded to one point of each of the positive electrode and the negative electrode, but this is not suitable for high rate discharge because the internal resistance of the battery is large, and the lithium ion battery generates heat and has high temperature during discharging. Therefore, in the lithium ion battery of one embodiment, the positive electrode current collector plate 24 and the negative electrode current collector plate 25 are disposed on the end faces 41 and 42, and are welded, for example laser-welded, to the active material non-covered portions 21C and 22C of the positive electrode and the negative electrode present on the end faces 41 and 42 at multiple points, thereby suppressing the internal resistance of the battery to be low. The details of joining the positive electrode current collector plate 24, the negative electrode current collector plate 25, and the active material non-covered portions 21C and 22C of the positive electrode and the negative electrode will be described later.

The positive electrode active material layer 21B contains at least a positive electrode material (positive electrode active material) capable of occluding and releasing lithium, and may further contain a positive electrode binder, a positive electrode conductive agent, and the like. The positive electrode material is preferably a lithium-containing compound (for example, a lithium-containing composite oxide and a lithium-containing phosphoric acid compound).

The lithium-containing composite oxide has, for example, a layered rock salt type or spinel type crystal structure. The lithium-containing phosphoric acid compound has, for example, an olivine-type crystal structure.

The positive electrode binder contains a synthetic rubber or a polymer compound. Examples of the synthetic rubber include styrene-butadiene-based rubber, fluorine-based rubber, and ethylene propylene diene. Examples of the polymer compound include polyvinylidene fluoride (PVdF) and polyimide.

The positive electrode conductive agent is a carbon material such as graphite, carbon black, acetylene black or Ketjen black. The positive electrode conductive agent may be a metal material or a conductive polymer.

The surface of the negative electrode foil 22A is preferably roughened. This is because close contact of the negative electrode active material layer 22B to the negative electrode foil 22A improves by a so-called anchor effect. The roughening method is, for example, a method of forming fine particles by an electrolytic method and providing asperities on the surface of the negative electrode foil 22A. A copper foil produced by an electrolytic method is typically called an electrolytic copper foil.

The negative electrode active material layer 22B at least contains a negative electrode material (negative electrode active material) capable of occluding and releasing lithium, and may further contain a negative electrode binder, a negative electrode conductive agent, and the like.

The negative electrode material includes, for example, a carbon material. This is because very few changes occur in the crystal structure at the time of occlusion and release of lithium and therefore a high energy density can be stably obtained. This is also because the carbon material also functions as a negative electrode conductive agent, and therefore the conductivity of the negative electrode active material layer 22B improves.

The carbon material is graphitizable carbon, non-graphitizable carbon, graphite, low crystalline carbon, or amorphous carbon. The carbon material has a fibrous shape, a spherical shape, a granular shape, or a scaly shape.

Further, the negative electrode material contains, for example, a metal-based material. Examples of the metal-based material include Li (lithium), Si (silicon), Sn (tin), Al (aluminum), Zr (zinc), and Ti (titanium). Metallic elements form compounds, mixtures or alloys with other elements, and examples thereof include silicon oxide ($SiO_x$ ($0<x≤2$)), silicon carbide (SiC), carbon-silicon alloy, and lithium titanium oxide (LTO).

In the lithium ion battery 1, when the open circuit voltage (that is, the battery voltage) at the time of full charge is 4.25 V or more, the release amount of lithium per unit mass increases as compared with the case where the open circuit voltage at the time of full charge is low with the same positive electrode active material. As a result, a high energy density can be obtained.

The separator 23 is a porous membrane containing a resin, and may be a layered membrane of two or more kinds of porous membranes. The resin is polypropylene, polyethylene, or the like.

The separator 23 may include a porous film as a substrate layer and a resin layer on one face or both faces of the porous film. This is because close contact of the separator 23 to each of the positive electrode 21 and the negative electrode 22 improves, which suppresses the distortion of the electrode wound body 20.

The resin layer contains a resin such as PVdF. When this resin layer is formed, a solution in which a resin is dissolved in an organic solvent is applied to the substrate layer, and then the substrate layer is dried. The substrate layer may be immersed in the solution and thereafter dried. It is preferable that the resin layer contain inorganic particles or organic particles from the viewpoint of improving heat resistance and battery safety. Examples of the kind of inorganic particles include aluminum oxide, aluminum nitride, aluminum hydroxide, magnesium hydroxide, boehmite, talc, silica, and mica. A surface layer containing inorganic particles as a main component, which is formed by a sputtering method, an ALD (atomic layer deposition) method, or the like, may be used instead of the resin layer.

The electrolyte solution contains a solvent and an electrolyte salt, and may further contain additives and the like, as necessary. The solvent is a nonaqueous solvent such as an organic solvent, or water. An electrolyte solution containing a nonaqueous solvent is called a nonaqueous electrolyte solution. Examples of the nonaqueous solvent include a cyclic carbonate ester, a chain carbonate ester, a lactone, a chain carboxylate ester, and a nitrile (mononitrile).

A typical example of the electrolyte salt is a lithium salt, and a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$). A mixture of these salts may be used, and among them, it is preferable to use a mixture of $LiPF_6$ and $LiBF_4$ from the viewpoint of improving battery characteristics. The content of the electrolyte salt is not particularly limited, and is preferably 0.3 mol/kg to 3 mol/kg with respect to the solvent.

A method for producing the lithium ion battery 1 according to one embodiment will be described with reference to FIGS. 3A to 3F and FIGS. 4A to 4D. 4A to 4D are plan views of, for example, the end face 41 on the positive electrode side.

First, a positive electrode active material was applied to the surface of the positive electrode foil 21A having a band shape to form a covered portion of the positive electrode 21, and a negative electrode active material was applied to the surface of the negative electrode foil 22A having a band shape to form a covered portion of the negative electrode 22. At this time, the positive electrode active material non-covered portion 21C and the negative electrode active material non-covered portion 22C where the positive active material or the negative active material was not applied were produced at one end in the lateral direction of the positive electrode 21 and one end in the lateral direction of the negative electrode 22. A notch was made in a part of the active material non-covered portions 21C and 22C, the part corresponding to the winding start in winding. Steps such as drying were performed on the positive electrode 21 and the negative electrode 22. Then, the positive electrode 21 and the negative electrode 22 were overlaid with the separator 23 interposed therebetween such that the positive electrode active material non-covered portion 21C and the negative electrode active material non-covered portion 22C face in opposite directions, and they were wound in a spiral shape in such a manner as to form the through hole 26 in the central axis and to dispose the produced notch in the vicinity of the central axis, whereby the electrode wound body 20 as shown in FIG. 3A was produced.

In FIGS. 3A, 3B, 3C, 4A and 4B, there are both a portion formed by bending (crushing) (first flat portion 50) and an unbent (uncrushed) portion (protruding portion) 38A in the exposed part of the positive electrode active material non-coverer portion 21C at the end face 41. The same applies to the end face on the negative electrode side. The protruding portion is shown in black. In the present specification, "flat portion" includes not only a portion having an exactly flat surface but also a surface having some asperities and surface roughness to the extent that the active material non-covered portion and the current collector plate can be joined.

Figure 3:
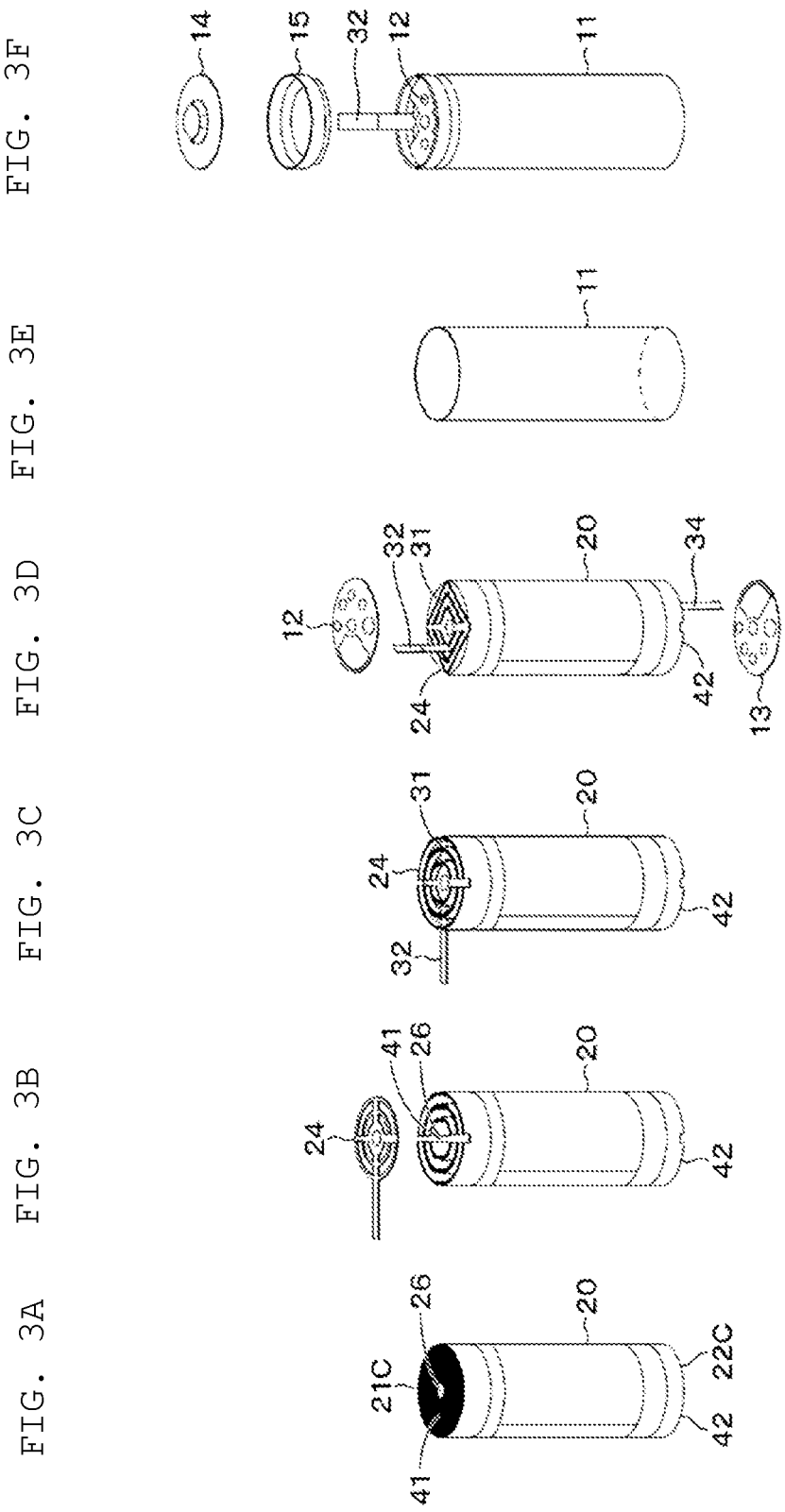
FIGS. 3A to 3F are views for describing an assembly process of the battery according to an embodiment of the present disclosure.
Figure 4:
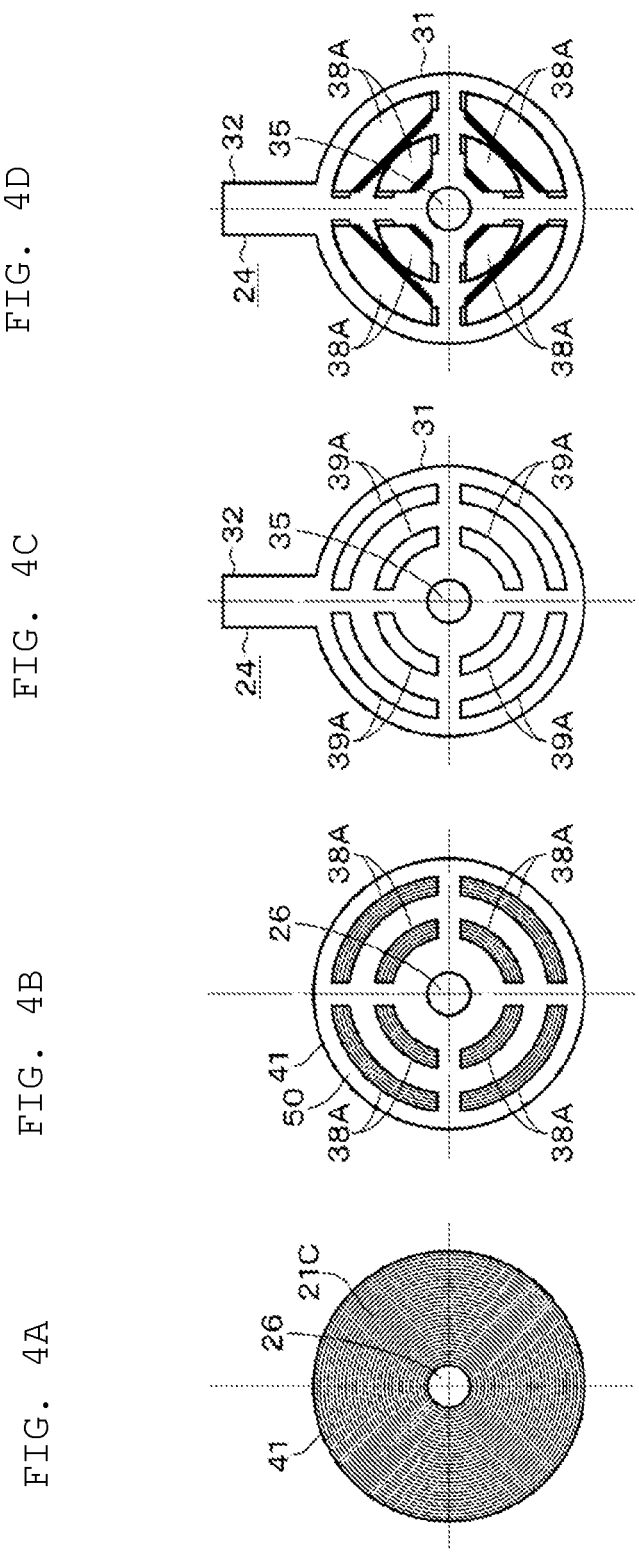
FIGS. 4A to 4D are plan views of an end face on a positive electrode side of the battery according to an embodiment of the present disclosure.

Next, as shown in FIGS. 3B and 4B, the flat portion and the protruding portion are formed such that the end face 41 where the active material non-covered portion 21C is exposed has a shape fitting to the opening of a plate-like portion of the positive electrode current collector plate 24. For this formation, a jig having an uneven shape corresponding to the opening is used. By making a cut (slit) in the active material non-covered portion 21C in advance at the boundary portion between the flat portion and the protruding portion, it is possible to prevent the foil from tearing and to prevent the protruding portion from being deformed. In this manner, a portion where a part of the active material non-covered portion is pressed and bent and a portion where the active material non-covered portion protrudes are formed on the end face 41 where the active material non-covered portion 21C is exposed. The bending of the active material non-covered portion 21C and the fitting of the active material non-covered portion 21C and the positive electrode current collector plate 24 may be performed at once by pressing the positive electrode current collector plate 24 against the exposed active material non-covered portion 21C of the end face 41 to pressurize it. Although the description of the end face 42 on the negative electrode side is omitted here, the same processing as the end face 41 on the positive electrode side is performed.

FIG. 4C shows one example of the positive electrode current collector plate 24. The material of the positive electrode current collector plate 24 is, for example, a metal plate made of a simple substance or a composite material of aluminum or an aluminum alloy. The negative electrode current collector plate 25 has the same shape as the positive electrode current collector plate 24. The material of the negative electrode current collector plate 25 is, for example, a metal plate made of a simple substance or a composite material of nickel, a nickel alloy, copper or a copper alloy. The positive electrode current collector plate 24 has a shape in which a rectangular band-shaped portion 32 is attached to a flat circular plate-like portion 31 having a shape substantially the same as the shape of the end face 41. A hole 35 is formed near the center of the plate-like portion 31, and the hole 35 is located at a position corresponding to the position of the through hole 26. The thickness of the plate-like portion 31 and the thickness of the band-shaped portion 32 are the same.

The positive electrode current collector plate 24 has a plurality of openings 39A formed in a concentric fashion. Each concentric circle has a connecting region with no openings at 90 degree angular intervals. The active material non-covered portion 21C exposed at the end face 41 is processed such that the protruding portion 38A enters and penetrates into the opening 39A when the positive electrode current collector plate 24 is overlaid on the end face 41.

Then, the positive electrode current collector plate 24 shown in FIG. 3C is fitted to the end face 41 shown in FIG. 3B. The protruding portion 38A of the active material non-covered portion 21C is caused to pass through the opening 39A of the positive electrode current collector plate 24 and to protrude on the non-opposing face side of the positive electrode current collector plate 24. Then, with a jig having a flat face, the protruding portion 38A is pressed and bent so as to overlap the surface of the non-opposing face of the positive electrode current collector plate 24. FIG. 4D shows a state in which the protruding portion 38A is bent and overlapped in the direction of the central axis of the electrode wound body.

The opposing face of the plate-like portion of the current collector plate refers to the face of the positive electrode current collector plate facing the positive electrode active material non-covered portion of the electrode wound body, and the face of the negative electrode current collector plate facing the negative electrode non-covered portion of the electrode wound body. The face opposite to the opposing face of the plate-like portion of the current collector plate is referred to as a non-opposing face. The shape of the opening provided in the current collector plate may be a hole, a notch, or a combination thereof.

Figure 5:
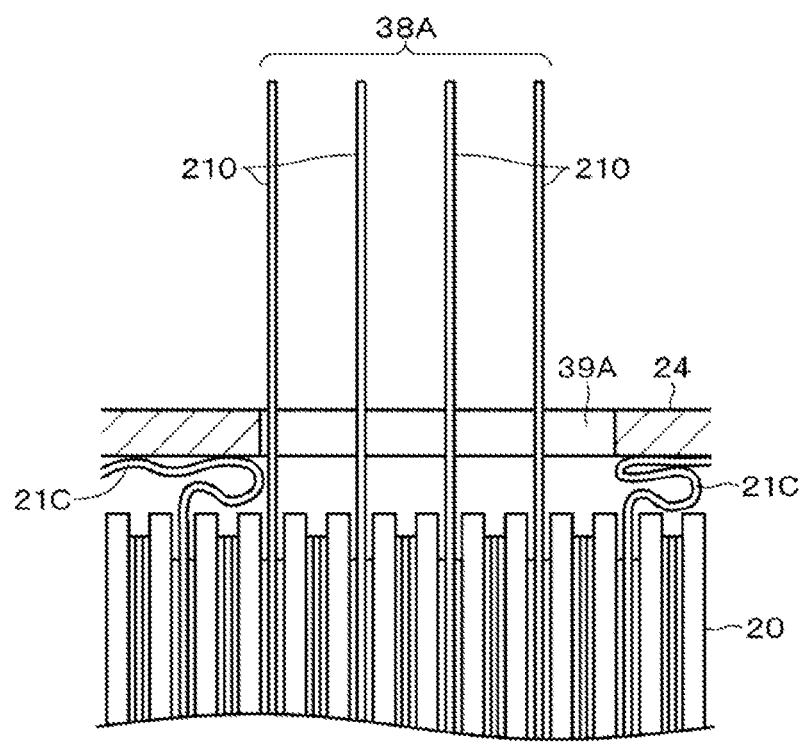
FIG. 5 is an enlarged sectional view showing a protruding portion of an active material non-covered portion according to an embodiment of the present disclosure.

FIG. 5 shows a part of the state in which the protruding portion 38A penetrates into the opening 39A in the plate-like portion of the positive electrode current collector plate 24. The amount of protrusion of the active material non-covered portion 21C from the surface (non-opposing face) of the positive electrode current collector plate 24 is, for example, 4 (mm). The first flat portion 50, which does not enter the opening 39A of the active material non-covered portion 21C, is in contact with the opposing face of the positive electrode current collector plate 24.

Figure 6:
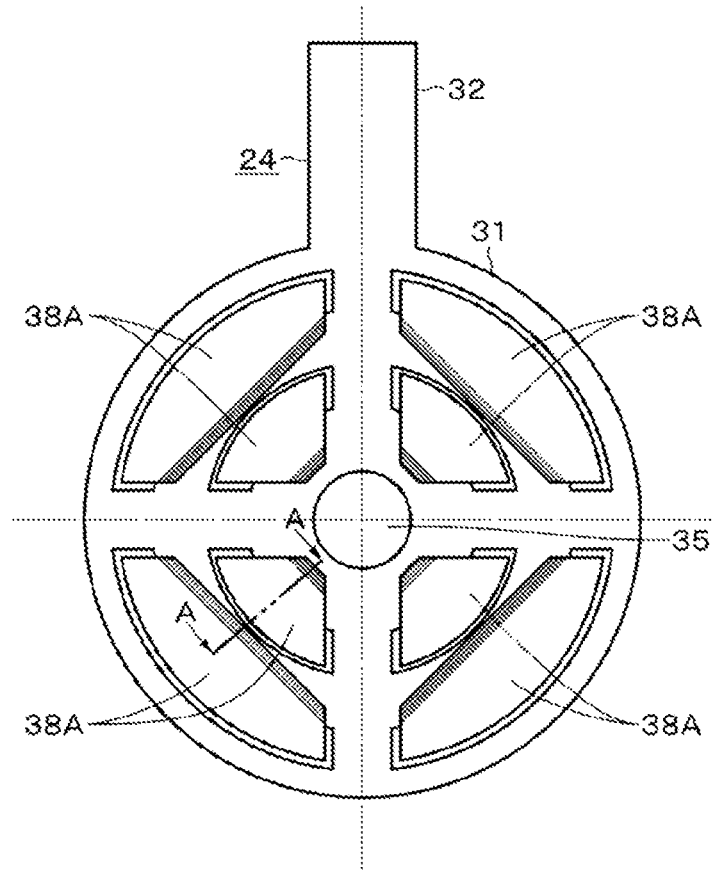
FIG. 6 is a plan view showing an active material non-covered portion bent on a surface of a positive electrode current collector plate according to an embodiment of the present disclosure.
Figure 7:
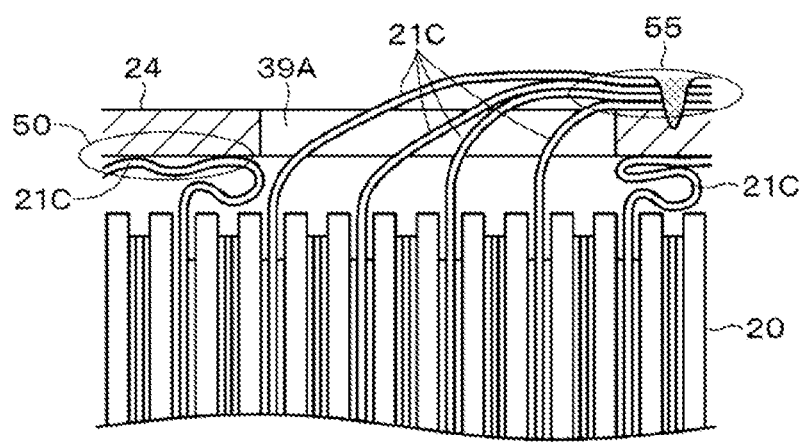
FIG. 7 is a sectional view showing an active material non-covered portion bent on a surface of a positive electrode current collector plate according to an embodiment of the present disclosure.
Figure 8:
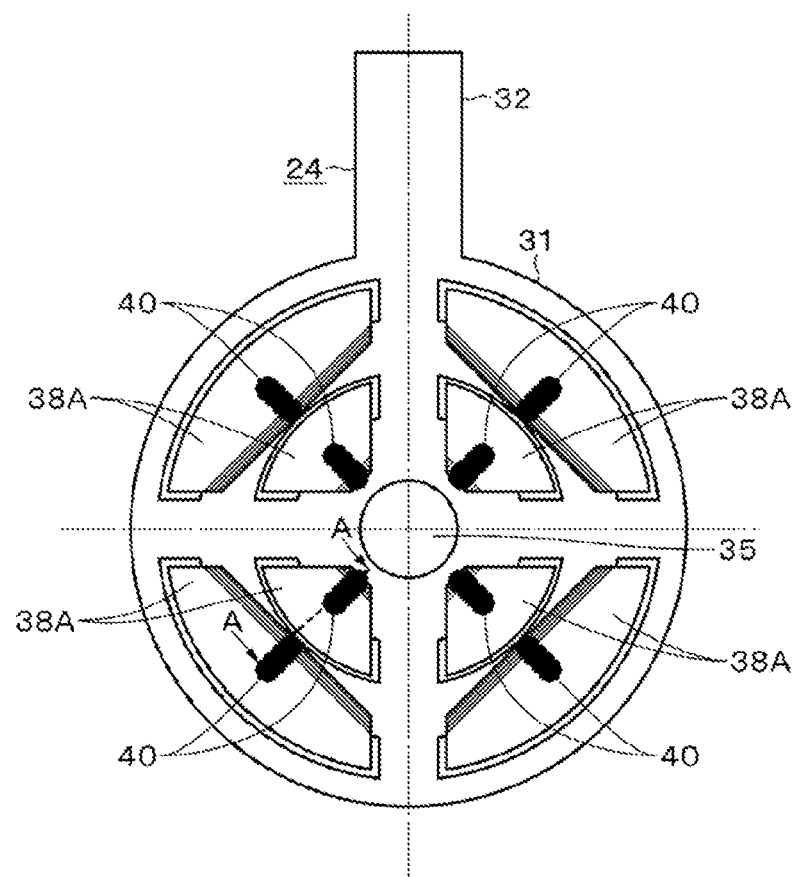
FIG. 8 is a plan view showing the welding position of an active material non-covered portion bent on a surface of a positive electrode current collector plate according to an embodiment of the present disclosure.

FIG. 6 shows, as in FIG. 4D, a state in which the protruding portion 38A of the active material non-covered portion 21C penetrating into the opening 39A of the positive electrode current collector plate 24 is bent in the direction of the hole 35 (direction toward the central axis) to form a second flat portion 55 having a fan shape. FIG. 7 is a sectional view of a part of FIG. 6 (line A-A). A part of the positive electrode active material non-covered portion is bent in the direction of the central axis of the wound structure and overlaps to form the second flat portion. A part of the second flat portion 55 is in contact with the non-opposing face of the plate-like portion of the positive electrode current collector plate 24. Welding is performed by irradiating a laser beam from the side of the second flat portion 55 toward the positive electrode current collector plate 24 to mechanically and electrically connect the active material non-covered portion 21C of the second flat portion 55 and the plate-like portion of the positive electrode current collector plate 24. In FIG. 8, the thick black lines indicate welding points 40. At one welding point 40, about five points of laser welding are performed. As laser welding, YAG laser, fiber laser, and the like are used.

The direction in which the protruding portion is bent does not have to be the direction toward the central axis of the electrode wound body, but it is preferable to be in the direction toward the central axis because the space inside the battery can be efficiently used.

Similarly to the positive electrode current collector plate 24 described above, the negative electrode active material non-covered portion 22C is formed at the end face 42 on the negative electrode side to have a protruding portion that penetrates the opening formed in the negative electrode current collector plate 25 and the first flat portion 50 that does not penetrate the opening. The amount of protrusion of the active material non-covered portion 22C from the non-opposing face of the plate-like portion of the negative electrode current collector plate 25 is, for example, 3 (mm). Then, the negative electrode current collector plate 25 is fitted to the active material non-covered portion 22C, the protruding portion penetrating from the opening of the negative electrode current collector plate 25 is bent to form a second flat portion 56, and laser welding is performed from the second flat portion 56 side to mechanically and electrically connect the active material non-covered portion 22C and the plate-like portion of the negative electrode current collector plate 25. The present disclosure may be applied to one of the positive electrode side and the negative electrode side.

Thereafter, as shown in FIG. 4D, the band-shaped portions 32 and 34 of the current collector plates 24 and 25 are bent, the insulators 12 and 13 are attached to the positive electrode current collector plate 24 and the negative electrode current collector plate 25, and the electrode wound body 20 assembled as described above was inserted into the exterior can 11 shown in FIG. 3E and welded to the bottom of the outer can 11. After an electrolyte solution was injected into the exterior can 11, the exterior can 11 was sealed with the gasket 15 and the battery lid 14 as shown in FIG. 3F. The upper and lower insulators 12 and 13 may be inserted at the time of welding and assembling the can bottom.

EXAMPLES

Table 1 shows the internal resistances of Examples and Comparative Examples using the lithium-ion battery 1 produced as described above. The present disclosure is not limited to Examples described below. The material of the positive electrode current collector plate 24 was Al alloy, and the material of the negative electrode current collector plate 25 was Cu alloy. The size of the battery was 21700

(diameter 21 (mm), length 70 (mm)). The number of batteries having defective welds out of 100 batteries that were actually laser welded was checked. The internal resistance (DC resistance) of the battery was measured, and a value of 11 (mΩ) or less was determined to be good. The DC resistance is obtained by calculating the slope of the voltage when the discharge current is increased from 0 (A) to 100 (A) in 5 seconds. Table 1 shows the results.

TABLE 1

| | Positive electrode | | Negative electrode | | | |
|---|---|---|---|---|---|---|
| | Current collector plate thickness (mm) | Active material non-covered portion thickness (mm) | Current collector plate thickness (mm) | Active material non-covered portion thickness (mm) | Number of batteries in which welding defect occurred out of 100 | DC resistance DCR (mΩ) |
| Example 1 | 0.100 | 0.010 | 0.080 | 0.010 | 0 | 10.21 |
| Example 2 | 0.200 | 0.010 | 0.080 | 0.010 | 0 | 10.16 |
| Comparative Example 1 | 0.100 | 0.010 | 0.080 | 0.010 | 2 (perforation occurred) | 14.89 |
| Comparative Example 2 | 0.200 | 0.010 | 0.080 | 0.010 | 3 (perforation occurred) | 15.35 |

Example 1

A battery was produced as in the above-described one embodiment, in which the thickness of the positive electrode current collector plate 24 was 0.1 (mm), the thickness of the positive electrode active material non-covered portion 21C was 0.01 (mm), the thickness of the negative electrode current collector plate 25 was 0.08 (mm), and the thickness of the negative electrode active material non-covered portion 22C was 0.01 (mm). In Example 1, no welding defect occurred and the internal resistance of the battery was 10.21 (mΩ).

Example 2

A battery was produced as in the above-described one embodiment, in which the thickness of the positive electrode current collector plate 24 was 0.2 (mm), the thickness of the positive electrode active material non-covered portion 21C was 0.01 (mm), the thickness of the negative electrode current collector plate 25 was 0.08 (mm), and the thickness of the negative electrode active material non-covered portion 22C was 0.01 (mm). In Example 2, no welding defect occurred and the internal resistance of the battery was 10.18 (mΩ).

Figure 9:
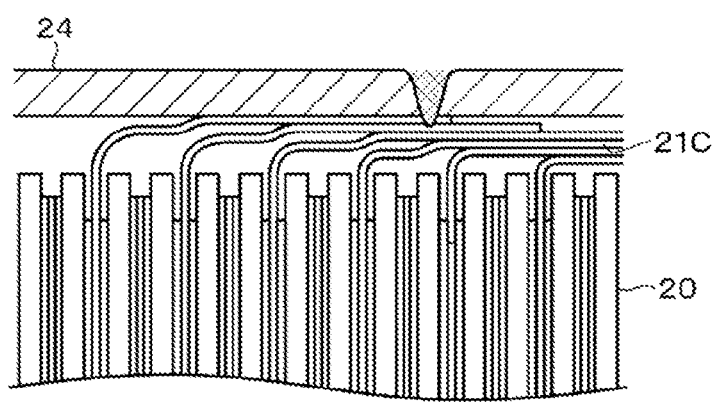
FIG. 9 is a sectional view showing an active material non-covered portion in contact with a back face of a positive electrode current collector plate according to an embodiment of the present disclosure.

In Comparative Examples, as shown in FIG. 9, the positive electrode current collector plate 24 did not have an opening, and the whole positive electrode active material non-covered portion 21C was folded toward the center to form a flat portion with the whole face. The front face of the flat portion of the active material non-covered portion 21C and the back face of the positive electrode current collector plate 24 were brought into close contact with each other, and laser welding was performed from the surface of the positive electrode current collector plate 24. In the same manner, on the negative electrode side, the active material non-covered portion 22C and the negative electrode current collector plate 25 were laser welded with the whole face as a flat portion.

Comparative Example 1

The thickness of the positive electrode current collector plate 24 was 0.1 (mm), the thickness of the positive electrode active material non-covered portion 21C was 0.01 (mm), the thickness of the negative electrode current collector plate 25 was 0.08 (mm), and the thickness of the negative electrode active material non-covered portion 22C was 0.01 (mm). In Comparative Example 1, welding defects occurred in two batteries out of 100 of produced batteries. The average value of the internal resistance (DC resistance) of the completed 98 batteries was 14.89 (mΩ). In the two batteries having welding defects, the current collector plate had holes in some of the welding points.

Comparative Example 2

The thickness of the positive electrode current collector plate 24 was 0.2 (mm), the thickness of the positive electrode active material non-covered portion 21C was 0.01 (mm), the thickness of the negative electrode current collector plate 25 was 0.08 (mm), and the thickness of the negative electrode active material non-covered portion 22C was 0.01 (mm). In Comparative Example 2, welding defects occurred in three batteries out of 100 of produced batteries. The internal resistance (DC resistance) of the 97 completed batteries was 15.35 (mΩ). In the three batteries having welding defects, the current collector plate had holes in some of the welding points.

In Example 1, 100 batteries were produced for each, and no welding defects occurred. Welding defects did not occur in Example 2 either in which the thickness of the current collector plate was increased. It was found that the structure in which the laser is irradiated from the non-opposing face side of the current collector plate and welded is not easily affected by the thickness of the current collector plate. On the other hand, the reason of the occurrence of welding defects as in Comparative Example 1 and Comparative Example 2 is that the current collector plate, which is thicker than the active material non-covered portion, is on the upper side, and therefore a high amount of heat is required to melt the current collector plate, which results in occurrence of excessive melting (perforation, deformation of hole shape, etc.). The reason of the increase in the internal resistance of the battery as in Comparative Example 1 and Comparative Example 2 is that the current collector plate, which is thicker than the non-covered portion, is on the upper side, and therefore the welding points have a wide variation in the penetration depth of the laser when laser welding is performed under relatively large output conditions, which makes it difficult to obtain stable electrical conduction. It is difficult to solve such a problem by controlling the power of the laser in welding. On the other hand, in the present disclosure, because the active material non-covered portion overlaps at the upper face (non-opposing face) of the current collector plate, it can be joined to the current collector plate by the amount of heat that melts the active material non-coated portion. Therefore, it is possible to prevent excessive melting (perforation, hole shape deformation, etc.) in laser welding. In addition, because the active material non-covered portion is in contact with the opposing face of the plate-like portion of the current collector plate and the active material non-covered portion is welded to the non-opposing face of the plate-like portion of the current collector plate, the current collecting efficiency is high. Therefore, it was possible to produce a high-power (high rate characteristic) battery without internal damage caused by laser welding. In addition, because the active material non-covered portion is in contact with the opposing face of the plate-like portion of the current collector plate and the active material non-covered portion is welded to the non-opposing face of the plate-like portion of the current collector plate, the plate-like portion is sandwiched from both sides and fixed. Therefore, the current collector plate and the end face of the electrode wound body are firmly joined to each other, and a battery resistant to external vibration and impact was able to be produced.

Although one embodiment of the present disclosure has been specifically described above, the content of the present disclosure is not limited to the above-described embodiment, and various modifications based on the technical idea of the present disclosure can be made.

Figure 10:
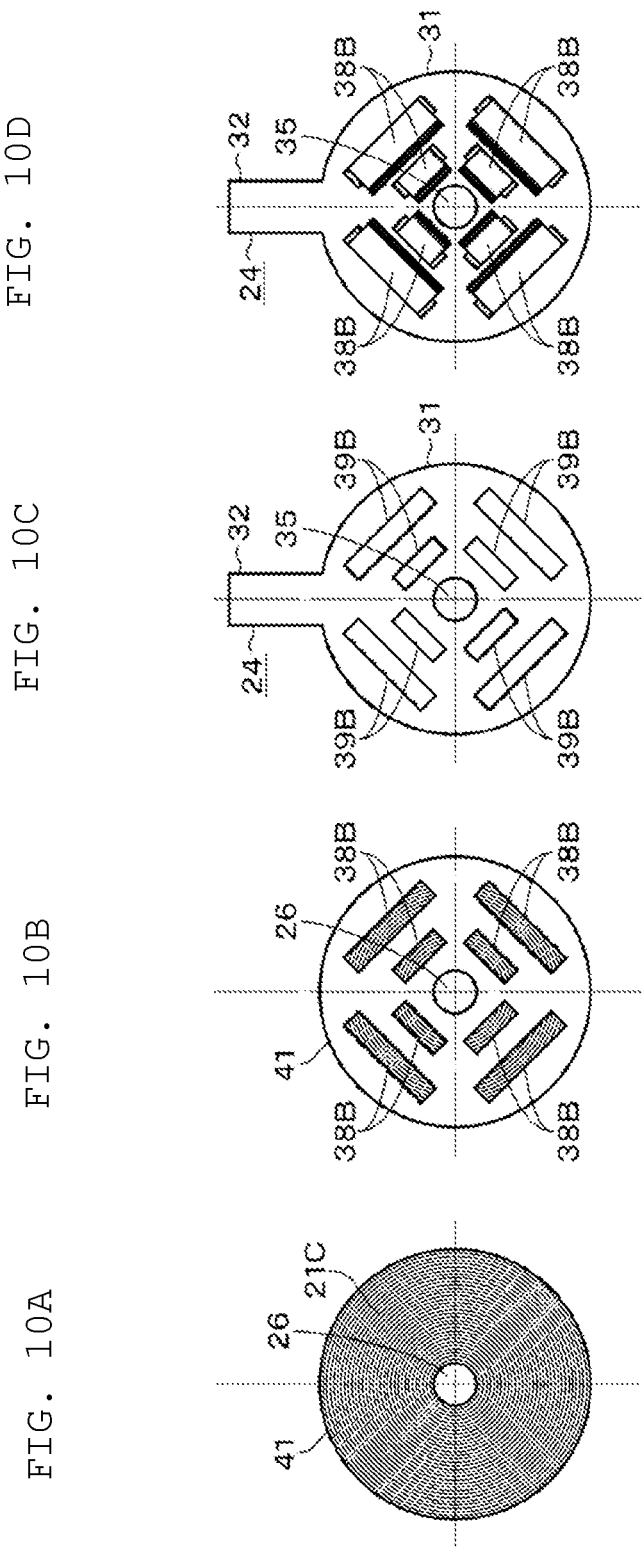
FIGS. 10A to 10D are plan views of an end face on a positive electrode side of a battery according to an embodiment of the present disclosure.

FIGS. 10A to 10D show one modification example. As shown in FIG. 10C, an opening 39B may be formed in such a manner as to form each side of a rectangle, and a protruding portion 38B (see FIG. 10B) having a shape to enter the opening 39B may be formed. FIG. 10D shows a state in which the protruding portion 38B that has entered the opening 39B is bent to form the second flat portion, and the second flat portion 55 is formed on the surface of the positive electrode current collector plate 24. The second flat portion 55 has a rectangular shape.

Figure 11:
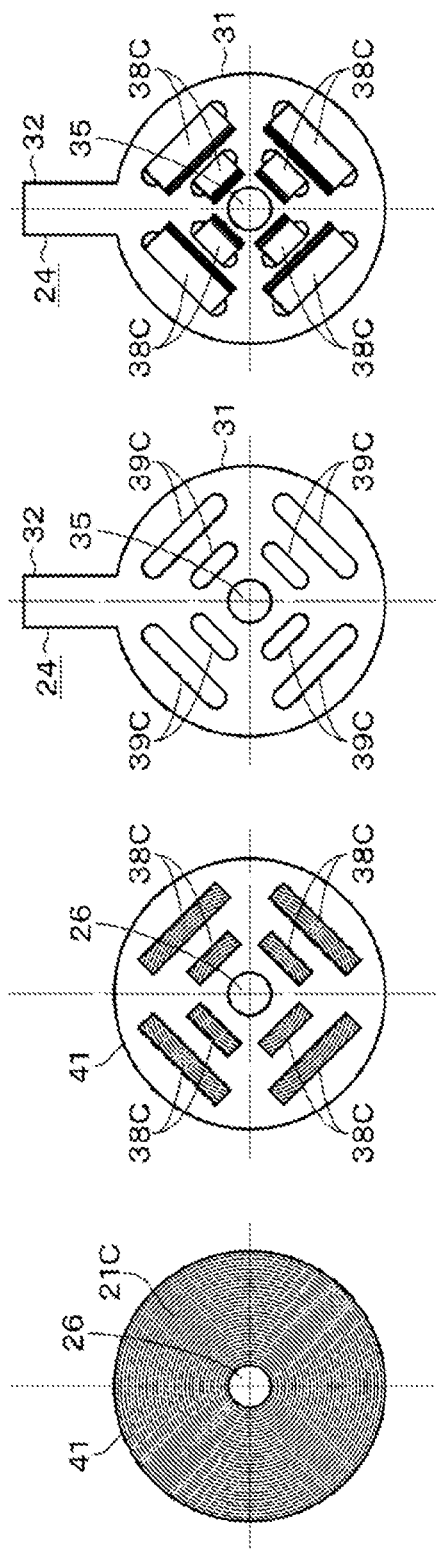
FIGS. 11A to 11D are plan views of an end face on a positive electrode side of a battery according to an embodiment of the present disclosure.

FIGS. 11A to 11D show another modification example. As shown in FIG. 11C, an opening 39C may be formed in such a manner as to form each side of a rectangle, and a protruding portion 38C (see FIG. 11B) having a shape to enter the opening 39C may be formed. FIG. 11D shows a state in which the protruding portion 38C that has entered the opening 39C is bent to form the second flat portion 55, and the second flat portion 55 is formed on the surface of the positive electrode current collector plate 24. In the example of FIG. 11, the short side of the opening 39C has an arc shape, which is different from the short side of the protruding portion 38C having a linear shape. That is, the protruding portion 38C and the opening 39C do not have to have exactly the same face shape as long as the opening 39C has an opening slightly larger than the protruding portion 38C. As the shape of the protruding portion and the opening, various shapes other than those described above are possible. For example, the current collector plate may have a circular opening, and the protruding portion that has entered the opening may be crushed to form a circular second flat portion 55. Further, the positive electrode current collector plate 24 may have one opening, and one protruding portion of the active material non-covered portion 21C may enter the opening and be bent.

Figure 12:
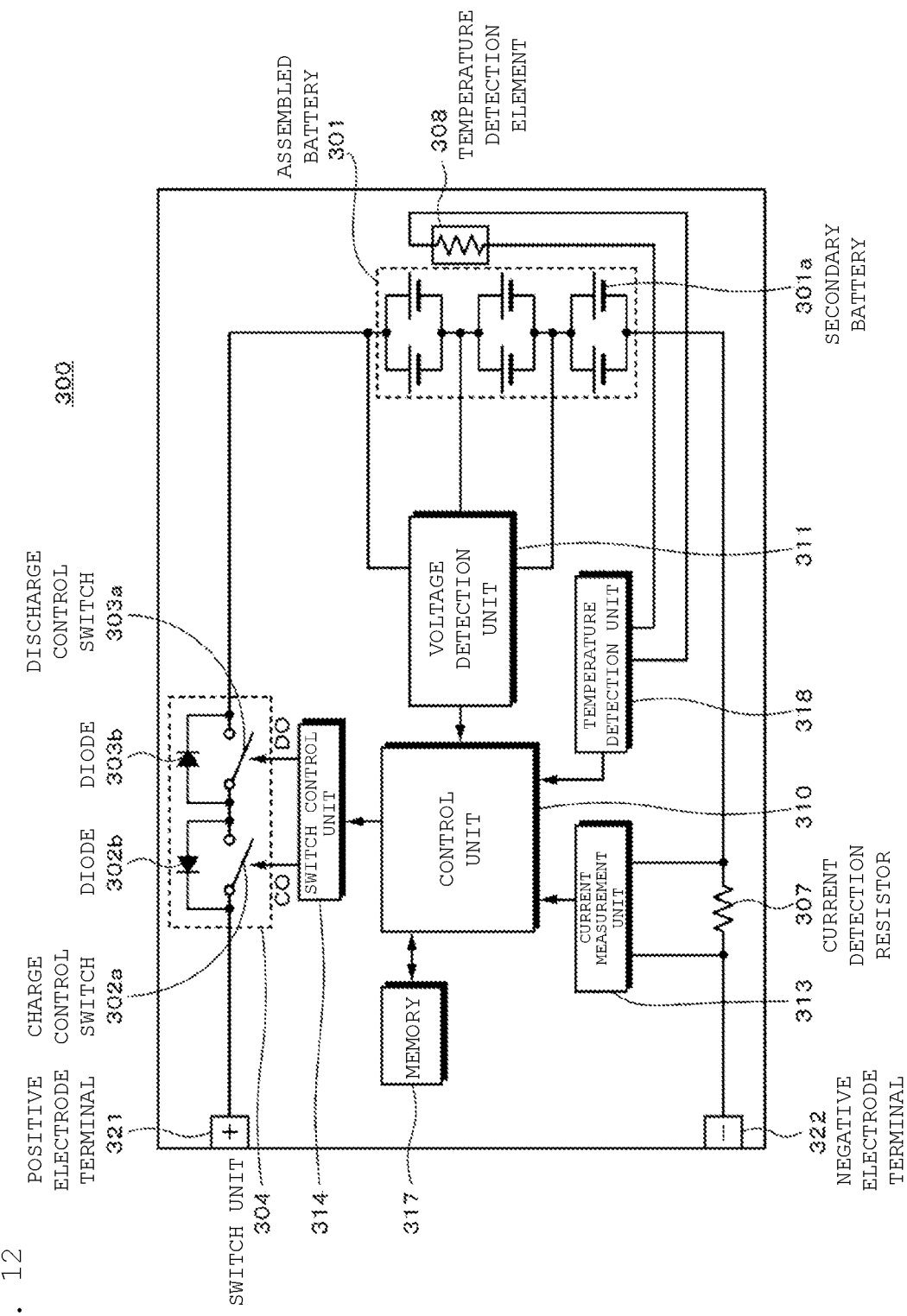
FIG. 12 is a connection diagram used for describing a battery pack as an application example according to an embodiment of the present disclosure.

FIG. 12 is a block diagram showing a circuit configuration example when the secondary battery according to the embodiment or Example of the present disclosure is applied to a battery pack 330. The battery pack 300 includes an assembled battery 301, a switch unit 304 including a charge control switch 302a and a discharge control switch 303a, a current detection resistor 307, a temperature detection element 308, and a control unit (controller) 310. The control unit 310 can control each device, perform charge/discharge control when abnormal heat generation occurs, and calculate and correct the remaining capacity of the battery pack 300. The control unit (controller) 310 includes at least one of a central processing unit (CPU), a processor or the like.

When the battery pack 300 is charged, a positive electrode terminal 321 and a negative electrode terminal 322 are connected to a positive electrode terminal and a negative electrode terminal of a charger, respectively, and charging is performed. When an electronic device connected to the battery pack 300 is used, the positive electrode terminal 321 and the negative electrode terminal 322 are connected to a positive electrode terminal and a negative electrode terminal of the electronic device, respectively, and discharging is performed.

The assembled battery 301 is formed by connecting a plurality of secondary batteries 301a in series and/or in parallel. In FIG. 12, a case where six secondary batteries 301a are connected in 2 parallels and 3 series (2P3S) is shown as an example, but any connection method may be used.

A temperature detection unit 318 is connected to a temperature detection element 308 (for example, a thermistor), measures the temperature of the assembled battery 301 or the battery pack 300, and supplies the measured temperature to the control unit 310. The voltage detection unit 311 measures the voltages of the assembled battery 301 and each of the secondary batteries 301a constituting the assembled battery, performs A/D conversion on the measured voltages, and supplies the converted voltages to the control unit 310. The current measurement unit 313 measures current using the current detection resistor 307 and supplies the measured current to the control unit 310.

The switch control unit 314 controls the charge control switch 302a and the discharge control switch 303a of the switch unit 304 based on the voltage and current input from the voltage detection unit 311 and the current measurement unit 313. When the voltage of any of the secondary batteries 301a becomes equal to or lower than the overcharge detection voltage or the overdischarge detection voltage, or when a large current rapidly flows, the switch control unit 314 sends a control signal to turn off to the switch unit 304 to prevent overcharging, overdischarging, and overcurrent charging and discharging.

Here, for example, when the secondary battery is a lithium ion secondary battery, the overcharge detection voltage is determined to be, for example, 4.20 V±0.05 V, and the overdischarge detection voltage is determined to be, for example, 2.4 V±0.1 V.

After the charge control switch 302a or the discharge control switch 303a is turned off, charging or discharging is possible only through the diode 302b or the diode 303b. As these charge/discharge switches, semiconductor switches such as MOSFET can be used. In this case, the parasitic diodes of the MOSFET function as the diodes 302b and 303b. Although the switch unit 304 is provided on the positive side in FIG. 12, it may be provided on the negative side.

The memory 317 includes a RAM and a ROM, and includes, for example, an erasable programmable read only memory (EPROM) which is a nonvolatile memory. In the memory 317, the numerical value calculated by the control unit 310, the battery characteristics in the initial state of each secondary battery 301a measured at the stage of the manufacturing process, and the like are stored in advance, and can be appropriately rewritten. In addition, by storing the full charge capacity of the secondary battery 301a, for example the remaining capacity can be calculated together with the control unit 310.

The secondary battery according to the embodiment or Example of the present disclosure described above can be mounted on a device such as an electronic device, an electric transport device, or a power storage device and used to supply electric power.

Examples of the electronic devices include notebook computers, smartphones, tablet terminals, PDAs (personal digital assistants), mobile phones, wearable terminals, video movies, digital still cameras, electronic books, music players, headphones, game machines, pacemakers, hearing aids, electric tools, televisions, lighting devices, toys, medical devices, and robots. Further, an electric transport device, a power storage device, an electric tool, and an electric unmanned aerial vehicle, which will be described later, may also be included in the electronic device in a broad sense.

Examples of the electric transport device include electric cars (including hybrid cars), electric motorcycles, electric-assisted bicycles, electric buses, electric carts, automated guided vehicles (AGV), and railway vehicles. The examples also include electric passenger aircrafts and electric unmanned aerial vehicles for transportation. The secondary battery according to the present disclosure is used not only as a power source for driving these, but also as an auxiliary power source, a power source for energy regeneration, and the like.

Examples of the power storage device include a power storage module for commercial or household use, a power storage power source for an architectural structure such as a residential house, a building, an office, or a power generation facility.

Figure 13:
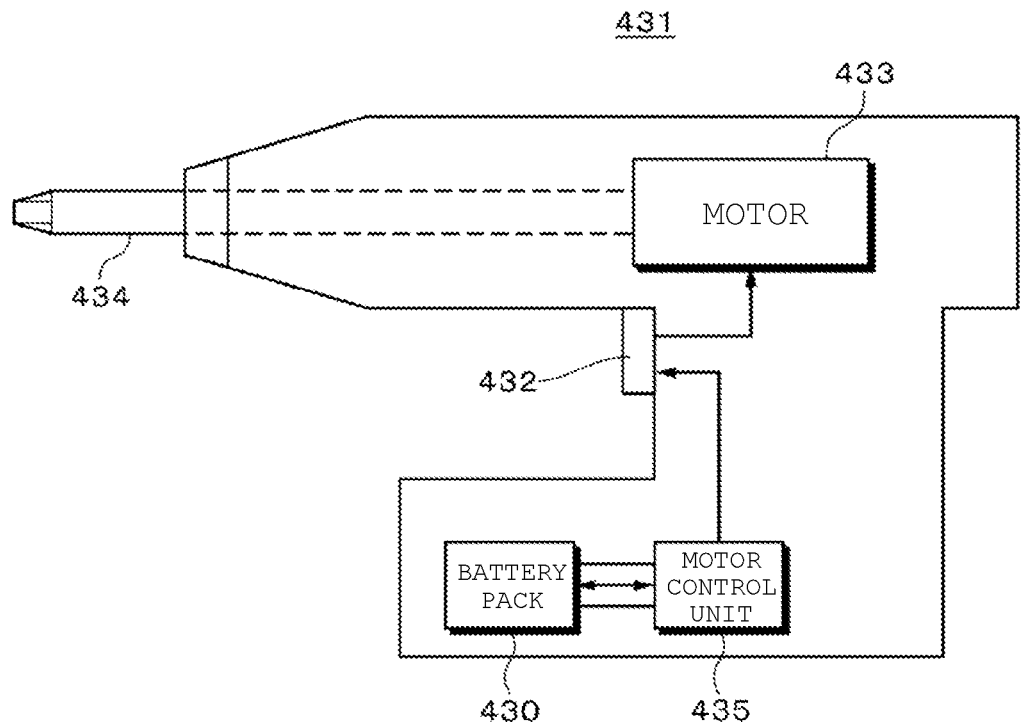
FIG. 13 is a connection diagram used for describing an electric tool as an application example according to an embodiment of the present disclosure.

An example of an electric tool, for example, an electric screwdriver to which the present disclosure can be applied will be schematically described with reference to FIG. 13. An electric screwdriver 431 is provided with a motor 433 that transmits rotational power to a shaft 434 and a trigger switch 432 to be operated by a user. By an operation of the trigger switch 432, a screw or the like is driven into an object by the shaft 434.

A battery pack 430 and a motor control unit 435 (motor controller) are accommodated in a lower housing of a handle of the electric screwdriver 431. As the battery pack 430, the battery pack 300 described above can be used.

The battery pack 430 is built in or detachable from the electric screwdriver 431. The battery pack 430 can be attached to the charging device in a state of being built in or detached from the electric screwdriver 431.

Each of the battery pack 430 and the motor control unit 435 is provided with a microcomputer. Power is supplied from the battery pack 430 to the motor control unit 435, and charge/discharge information on the battery pack 430 is communicated between the microcomputers of the battery pack 430 and the motor control unit 435. The motor control unit (motor controller) 435 controls, rotation/stop and a rotation direction of the motor 433, and can cut off the power supply to the load (the motor 433, etc.) at the time of overdischarging. The motor control unit (motor controller) 435 includes at least one of a microcomputer, a central processing unit (CPU), a processor or the like.

Figure 14:
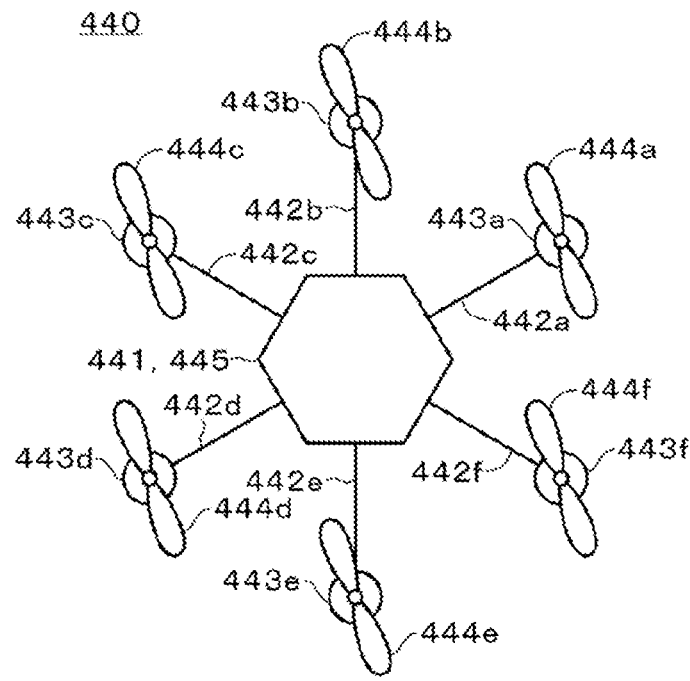
FIG. 14 is a connection diagram used for describing an unmanned aerial vehicle as an application example according to an embodiment of the present disclosure.

An example in which the present disclosure is applied to a power source for an electric unmanned aerial vehicle 440 (hereinafter, simply referred to as "drone 440") will be described with reference to FIG. 14. The drone 440 of FIG. 14 includes, as its machine body, a cylindrical or square tubular body 441, support shafts 442a to 442f fixed to an upper part of the body, and a battery portion (not shown) arranged below the body. As one example, the body 6 has a hexagonal tubular shape, and six support shafts 442a to 442f radially extend from the center of the body at equal angular intervals.

Motors 443a to 443f as drive sources of rotary wings 444a to 444f are respectively attached to tip portions of the support shafts 442a to 442f. A control circuit unit (motor controller) 445 for controlling each motor is attached to an upper portion of the body 441. The motor control circuit (motor controller) includes at least one of a central processing unit (CPU), a processor or the like. As the battery unit, the secondary battery or the battery pack 300 according to the present disclosure can be used. There is no limit to the number of the secondary batteries and the battery packs, and it is preferable that the number of the pairs of the rotary wings (three in FIG. 14) be equal to the number of the battery packs. Further, the drone 440 may be provided with a camera or a loading platform capable of carrying a small amount of cargo.

Figure 15:
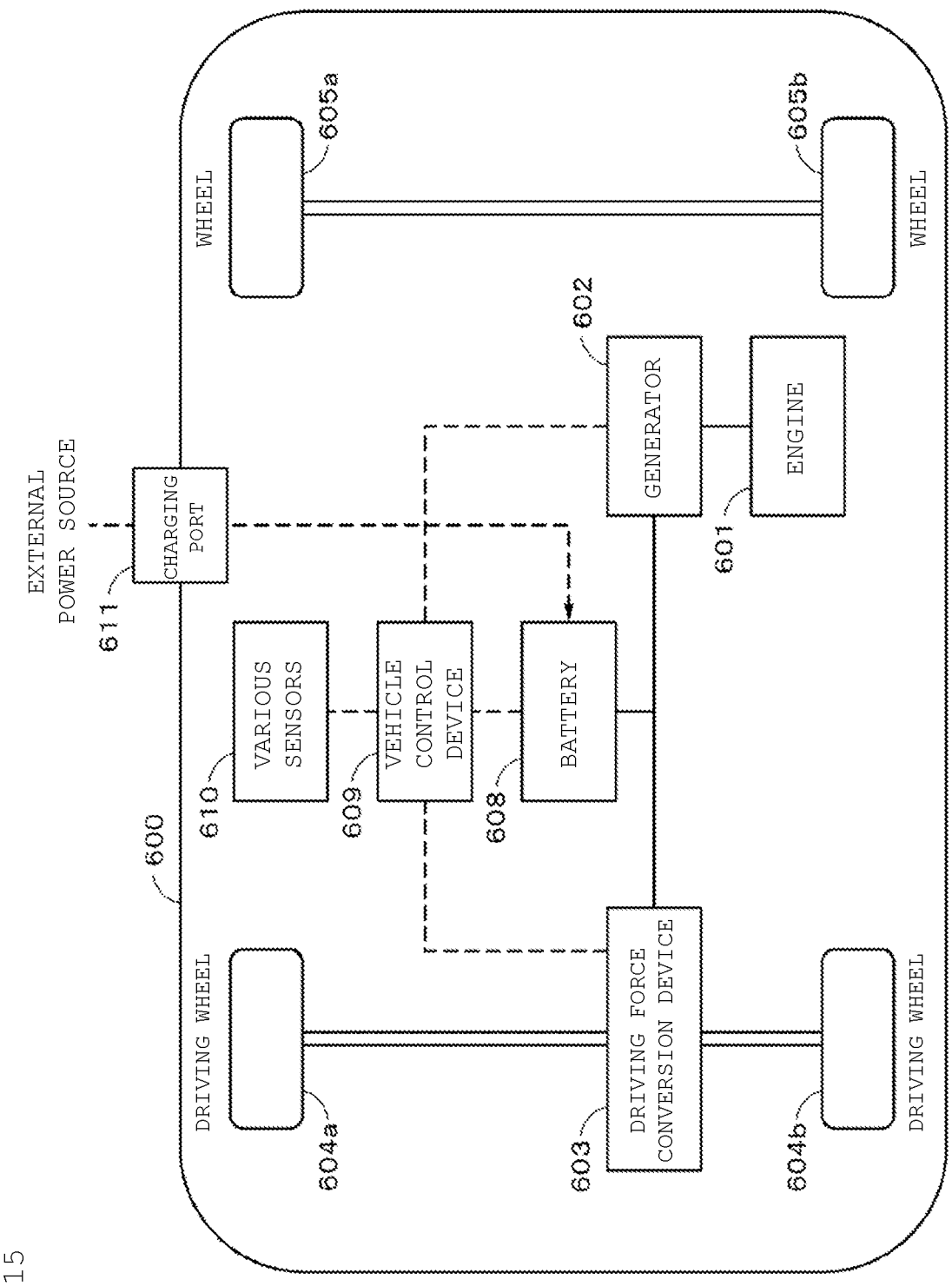
FIG. 15 is a connection diagram used for describing an electric vehicle as an application example according to an embodiment of the present disclosure.

As an example of applying the present disclosure to a power storage system for electric vehicles, FIG. 15 schematically shows a configuration example of a hybrid vehicle (HV) employing a series hybrid system. The series hybrid system is a vehicle that travels with an electric power driving force conversion device using electric power generated by a generator driven by an engine or the electric power temporarily stored in a battery.

In this hybrid vehicle 600, an engine 601, a generator 602, an electric power driving force conversion device (a driving force converter) 603 (DC motor or AC motor, it is simply referred to as "motor 603"), a driving wheel 604a, a driving wheel 604b, a wheel 605a, a wheel 605b, a battery 608, a vehicle control device 609, various sensors 610, and a charging port 611 are mounted. The battery pack 300 of the present disclosure described above or a power storage module equipped with a plurality of the secondary batteries of the present disclosure can be applied to the battery 608. The secondary battery has a cylindrical shape, a square shape, or a laminated shape.

The motor 603 is operated by the electric power of the battery 608, and the rotational force of the motor 603 is transmitted to the driving wheels 604a and 604b. The rotational force of the engine 601 is transmitted to the generator 602, and electric power generated from the rotational force by the generator 602 can be stored in the battery 608. The various sensors 610 control the engine speed through the vehicle control device 609, and control the opening degree of a throttle valve (not shown). The various sensors 610 include a speed sensor, an acceleration sensor, an engine speed sensor, and the like.

When the hybrid vehicle 600 is decelerated by a braking mechanism (not shown), a resistance force at the time of deceleration is applied to the motor 603 as a rotational force, and regenerative electric power generated from the rotational force is stored in the battery 608. In addition, an information processing device (for example, remaining battery level display device) that performs information processing related to vehicle control based on information related to the secondary battery may be provided, which is not shown. The battery 608 can receive power supply by being connected to an external power source through the charging port 611 of the hybrid vehicle 600 and store the power. Such an HV vehicle is called a plug-in hybrid vehicle (PHV or PHEV).

In the above, a series hybrid vehicle has been described as an example, but the present disclosure can also be applied to a parallel system in which an engine and a motor are used in combination, or a hybrid vehicle in which a series system and a parallel system are combined. Further, the present disclosure can also be applied to an electric vehicle (EV or BEV) and a fuel cell vehicle (FCV) that travel only by a drive motor without using an engine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an electrode wound body having a structure in which a positive electrode and a negative electrode are stacked and wound with a separator interposed therebetween;
a positive electrode current collector plate;
a negative electrode current collector plate; and
an exterior can that accommodates the electrode wound body, the positive electrode current collector plate, and the negative electrode current collector plate,
wherein
the positive electrode has a first covered portion covered with a positive electrode active material layer and a positive electrode active material non-covered portion on a positive electrode foil,
the negative electrode has a second covered portion covered with a negative electrode active material layer and a negative electrode active material non-covered portion on a negative electrode foil,
the positive electrode active material non-covered portion is joined to the positive electrode current collector plate on a first end face of the electrode wound body,
the negative electrode active material non-covered portion is joined to the negative electrode current collector plate on a second end face of the electrode wound body,
one or both of the positive electrode current collector plate and the negative electrode current collector plate have a band-shaped portion and a plate-like portion in which an opening is formed, and
the plate-like portion has an opposing face and a non-opposing face,
the opposing face of the plate-like portion of the positive electrode current collector plate faces a first end face of the electrode wound body,
the opposing face of the plate-like portion of the negative electrode current collector plate faces a second end face of the electrode wound body,
at least a first part of the positive electrode active material non-covered portion or a first part of the negative electrode active material non-covered portion penetrates the opening and is joined to the non-opposing face of the plate-like portion.

2. The secondary battery according to claim 1, wherein
at least a second part of the positive electrode active material non-covered portion or a second part of the negative electrode active material non-covered portion is bent to form a first flat portion, and
a part of the first flat portion is in contact with the opposing face of the positive electrode current collector plate or the negative electrode current collector plate.

3. The secondary battery according to claim 1, wherein
the first part of the positive electrode active material non-covered portion or the first part of the negative electrode active material non-covered portion penetrating the opening is bent to form a second flat portion, and
a part of the second flat portion is in contact with the non-opposing face of the positive electrode current collector plate or the negative electrode current collector plate and another part of the second flat portion is joined to the non-opposing face of the positive electrode current collector plate or the negative electrode current collector plate by welding from a surface side of the second flat portion.

4. The secondary battery according to claim 2, wherein
the first part of the positive electrode active material non-covered portion or the first part of the negative electrode active material non-covered portion penetrating the opening is bent to form a second flat portion, and
a part of the second flat portion is in contact with the non-opposing face of the positive electrode current collector plate or the negative electrode current collector plate and another part of the second flat portion is joined to the non-opposing face of the positive electrode current collector plate or the negative electrode current collector plate by welding from a surface side of the second flat portion.

5. The secondary battery according to claim 3, wherein the first part of the positive electrode active material non-covered portion or the first part of the negative electrode active material non-covered portion is bent in a direction of a central axis of the wound structure and overlaps to form the second flat portion.

6. The secondary battery according to claim 1, wherein the joining is performed by laser welding.

7. The secondary battery according to claim 1, wherein a material of the positive electrode current collector plate includes aluminum or an aluminum alloy.

8. The secondary battery according to claim 1, wherein a material of the negative electrode current collector plate includes a simple substance of nickel, a nickel alloy, copper, a copper alloy, or a composite material thereof.

9. A battery pack comprising:
the secondary battery according to claim 1;
a controller configured to control the secondary battery; and
an exterior body enclosing the secondary battery.

10. An electronic device comprising the secondary battery according to claim 1.

11. An electronic device comprising the battery pack according to claim 9.

12. An electric tool comprising the battery pack according to claim 9 and using the battery pack as a power source.

13. An electric vehicle comprising:
the secondary battery according to claim 1; and a converter that receives supply of electric power from the secondary battery and converts the electric power into a driving force of the electric vehicle.

\* \* \* \* \*